(12) United States Patent
Vandermeijden et al.

(10) Patent No.: US 9,383,861 B2
(45) Date of Patent: Jul. 5, 2016

(54) SYSTEMS AND METHODS FOR IMAGE FILTERING IN SENSOR DEVICES

(71) Applicant: SYNAPTICS INCORPORATED, Santa Clara, CA (US)

(72) Inventors: Tom Vandermeijden, Santa Clara, CA (US); Erol Eryilmaz, Los Altos Hills, CA (US)

(73) Assignee: Synaptics Incorporated, San Jose, CA (US)

( * ) Notice: Subject to any disclaimer, the term of this patent is extended or adjusted under 35 U.S.C. 154(b) by 504 days.

(21) Appl. No.: 13/837,843

(22) Filed: Mar. 15, 2013

(65) Prior Publication Data

US 2014/0267080 A1 Sep. 18, 2014

(51) Int. Cl.
*G06F 3/041* (2006.01)

(52) U.S. Cl.
CPC .... *G06F 3/0418* (2013.01); *G06F 2203/04104* (2013.01)

(58) Field of Classification Search
CPC ............... G06F 3/044; G06F 3/0416–3/0418; G06F 3/041; G06F 3/0488; G06F 2203/04104; G06F 11/00; G02F 1/13338
USPC .................................................. 345/173, 174
See application file for complete search history.

(56) References Cited

U.S. PATENT DOCUMENTS

| | | | |
|---|---|---|---|
| 7,337,085 B2 * | 2/2008 | Soss | 702/104 |
| 7,663,607 B2 * | 2/2010 | Hotelling | G06F 3/0416 178/18.01 |
| 8,248,084 B2 | 8/2012 | Bokma et al. | |
| 8,339,286 B2 | 12/2012 | Cordeiro | |
| 8,350,821 B2 | 1/2013 | Land et al. | |
| 8,395,589 B2 | 3/2013 | Wisniewski | |
| 2008/0158174 A1 * | 7/2008 | Land et al. | 345/173 |
| 2008/0158185 A1 * | 7/2008 | Westerman | 345/173 |
| 2011/0216016 A1 | 9/2011 | Rosener | |
| 2013/0176271 A1 * | 7/2013 | Sobel et al. | 345/174 |
| 2014/0022201 A1 * | 1/2014 | Boychuk et al. | 345/174 |

OTHER PUBLICATIONS

Loomis, John, "Gradient Filters", University of Dayton, Mar. 2, 2000, as archived Nov. 20, 2003 by the Wayback Machine.*

* cited by examiner

*Primary Examiner* — Julie Anne Watko
(74) *Attorney, Agent, or Firm* — Osha Liang LLP

(57) ABSTRACT

A processing system for an input device includes a sensor module, a filter module, and a determination module. The sensor module is configured to drive a plurality of transmitter electrodes with transmitter signals; receive, with a plurality of receiver electrodes, resulting signals comprising effects corresponding to the transmitter signals; and produce a first sensor image based on the resulting signals. The filter module is configured to produce a transformed sensor image by applying a spatial filter to the first sensor image. The determination module is configured to positional information and/or the validity of a baseline for the input device based on the transformed sensor image.

12 Claims, 3 Drawing Sheets

SYSTEMS AND METHODS FOR IMAGE FILTERING IN SENSOR DEVICES

FIELD OF THE INVENTION

This invention generally relates to electronic devices, and more specifically relates to sensor devices.

BACKGROUND OF THE INVENTION

Input devices including proximity sensor devices (also commonly called touchpads, position sensing devices, or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers).

Capacitive sensor devices often incorporate a "baseline" reading to determine position information corresponding to input devices in the sensing region. Such baselining is undesirable in some respects, however, as baselines may be subject to side effects, such as persistent ghost fingers (or "hallucinated objects"), dead spots, and the like. Consequently, there continues to be a need for systems and methods that can validate and/or eliminate the use of baselining in input devices.

BRIEF SUMMARY OF THE INVENTION

A processing system for an input device in accordance with one embodiment comprises a sensor module, a filter module, and a determination module. The sensor module is configured to drive a plurality of transmitter electrodes with transmitter signals; receive, with a plurality of receiver electrodes, resulting signals comprising effects corresponding to the transmitter signals; and produce a first sensor image based on the resulting signals. The filter module is configured to produce a transformed sensor image by applying a spatial filter to the first sensor image in a reduced accuracy mode. The determination module is configured to positional information and/or the validity of a baseline for the input device based on the transformed sensor image.

A method for an input device in accordance with one embodiment comprises: driving a plurality of transmitter electrodes with transmitter signals; receiving, with a plurality of receiver electrodes, resulting signals comprising effects corresponding to the transmitter signals; producing a first sensor image based on the resulting signals; producing a transformed sensor image by applying a spatial filter to the first sensor image in a reduced accuracy mode; and determining at least one of positional information and a validity of a baseline for the input device based on the transformed sensor image.

A sensor device in accordance with one embodiment comprises a plurality of transmitter electrodes, a plurality of receiver electrodes, and a processing system communicatively coupled to the plurality of transmitter electrodes and the plurality of receiver electrodes. The processing system is configured to: drive a plurality of transmitter electrodes with transmitter signals; receive, with a plurality of receiver electrodes, resulting signals comprising effects corresponding to the transmitter signals; produce a first sensor image based on the resulting signals; produce a transformed sensor image by applying a spatial filter to the first sensor image in a reduced accuracy mode; and determine at least one of positional information and a validity of a baseline for the input device based on the transformed sensor image

BRIEF DESCRIPTION OF DRAWINGS

The present invention will hereinafter be described in conjunction with the appended drawings, where like designations denote like elements, and.

DETAILED DESCRIPTION OF THE INVENTION

The following detailed description presents a number of example embodiments and is not intended to limit the invention or the application and uses of the invention. Furthermore, there is no intention to be bound by any expressed or implied theory presented in the preceding technical field, background, brief summary, or the following detailed description.

Figure 1:
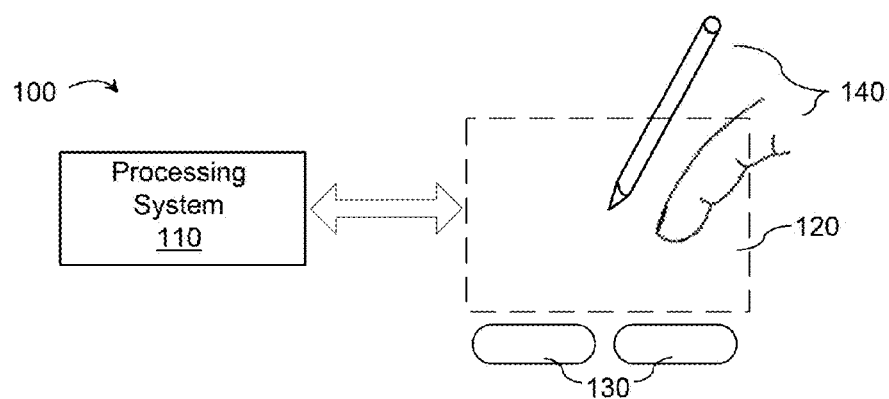
FIG. 1 is a block diagram of an example system that includes an input device in accordance with an embodiment of the invention.

Various embodiments of the present invention provide input devices and methods that facilitate improved usability. FIG. 1 is a block diagram of an example input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be substantially uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

Sensor electrodes may be arranged substantially perpendicular to each other, and may therefore be referred to as an "image" sensor. It will be appreciated, however, that the invention is not so limited, and that a variety of electrode patterns and shapes may be suitable in any particular embodiment. Sensor electrodes are typically ohmically isolated from each other. In some embodiments, such sensor electrodes are separated from each by one or more substrates. For example, they may be disposed on opposite sides of the same substrate, or on different substrates that are laminated together. In one embodiment, sensor electrodes are be constructed from opaque or substantially opaque conductive materials; in other embodiments, sensor electrodes are constructed from transparent or substantially transparent conductive material, such as patterned ITO, ATO, carbon fiber nanotubes, or other substantially transparent materials.

Some sensor electrodes may be configured as receiver electrodes, and some sensor electrodes may be configured as transmitter electrodes. The capacitive coupling between the transmitter electrodes and receiver electrodes change with the proximity and motion of input objects in the sensing region associated with the transmitter electrodes and receiver electrodes. Sensor electrodes might be disposed on a single layer of a substrate (either with or without jumpers), on multiple different substrates, or on different sides of the same substrate.

The receiver electrodes may be operated singly or multiply to acquire resulting signals. The resulting signals may be used to determine a "capacitive frame" representative of measurements of the capacitive couplings. Multiple capacitive frames may be acquired over multiple time periods, and differences between them used to derive information about input in the sensing region. For example, successive capacitive frames acquired over successive periods of time can be used to track the motion(s) of one or more input objects entering, exiting, and within the sensing region.

Referring again to FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like. In one embodiment, processing system 110 includes determination circuitry configured to determine positional information for an input device based on the measurement.

"Positional information" as used herein broadly encompasses absolute position, relative position, velocity, acceleration, and other types of spatial information. Example "zero-dimensional" positional information includes near/far or contact/no contact information. Example "one-dimensional" positional information includes positions along an axis. Example "two-dimensional" positional information includes motions in a plane. Example "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
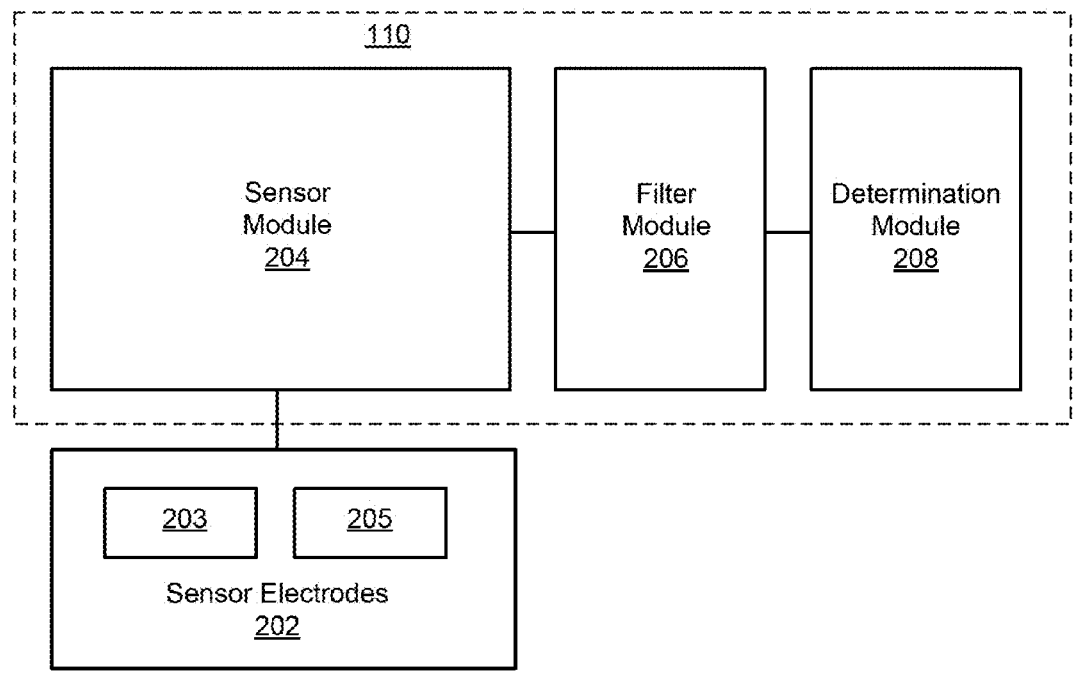
FIG. 2 is a conceptual block diagram depicting an processing system.

Referring now to the conceptual block diagram depicted in FIG. 2, an example processing system 110 in accordance with one embodiment generally includes a sensor module 204, a filter module 206, and a determination module 208. Sensor module 204 is communicatively coupled to a set of sensor electrodes 202, which may include one or more transmitter electrodes 303 and one or more receiver electrodes 205.

In general, sensor module 204 includes any combination of software and/or hardware (e.g., transmitter circuitry or receiver circuitry) configured to drive transmitter electrodes 303 with transmitter signals, and receive, with receiver electrodes 205, resulting signals comprising effects corresponding to the transmitter signals. Sensor module 204 is further configured to produce a first sensor image (e.g., a "raw" sensor image) based on the resulting signals.

Filter module 206 includes any combination of hardware and/or software configured to produce a transformed sensor image by applying a spatial filter (e.g., a high pass, two-axis gradient sweep sensor) to the first sensor image, typically in a reduced accuracy mode—i.e., a mode in which the absolute accuracy of the resulting position information is reduced but the ability to validate and/or eliminate the baseline of the sensor image is increased.

Determination module 208 includes any combination of hardware and/or software configured to determine at least one of positional information and a validity of a baseline for the input device based on the transformed sensor image. That is, the improved baseline information received via use of the spatial filter allows the baseline to be validated, or, in an alternate embodiment, eliminated altogether, as described in further detail below. In one embodiment, the filter module is configured to apply the spatial filter substantially simultaneously with the determination module determining the validity of the baseline.

Figure 5:
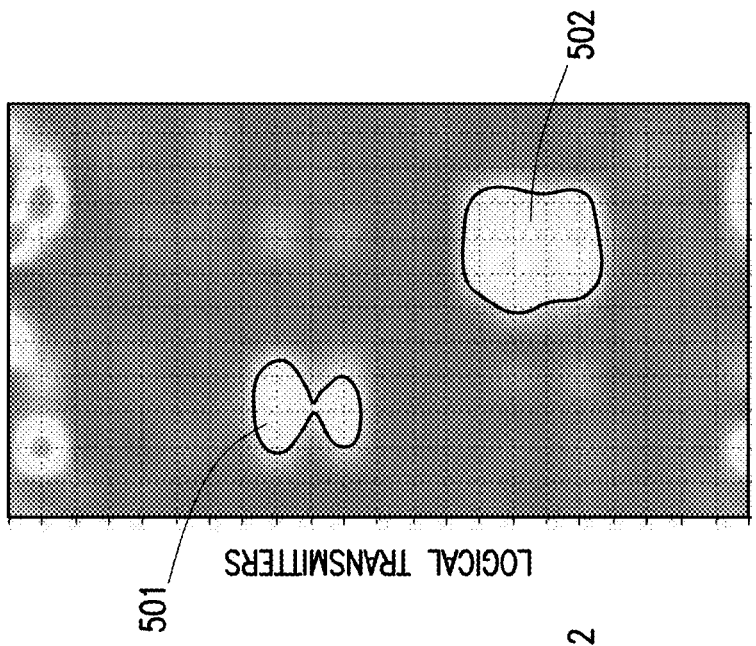
FIG. 5 is a transformed sensor image resulting from applying a spatial filter to a raw image associated with the delta sensor image of FIG. 5.
Figure 4:
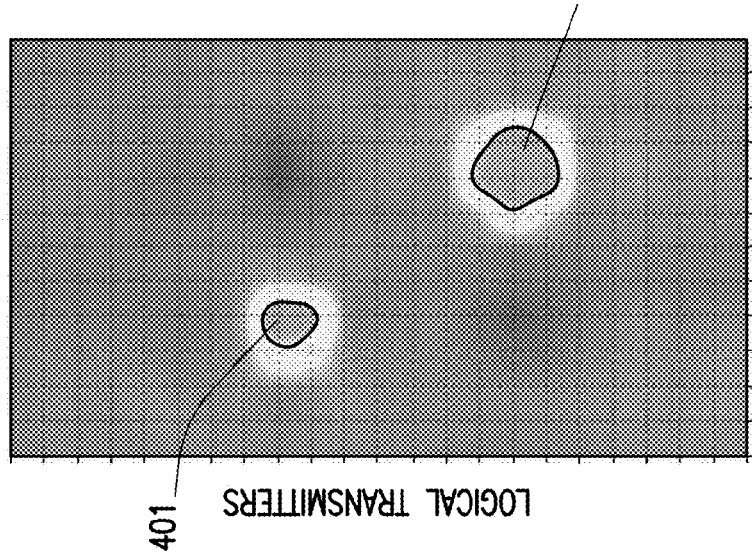
FIG. 4 is a plot of an example delta sensor image.
Figures 6, 7:
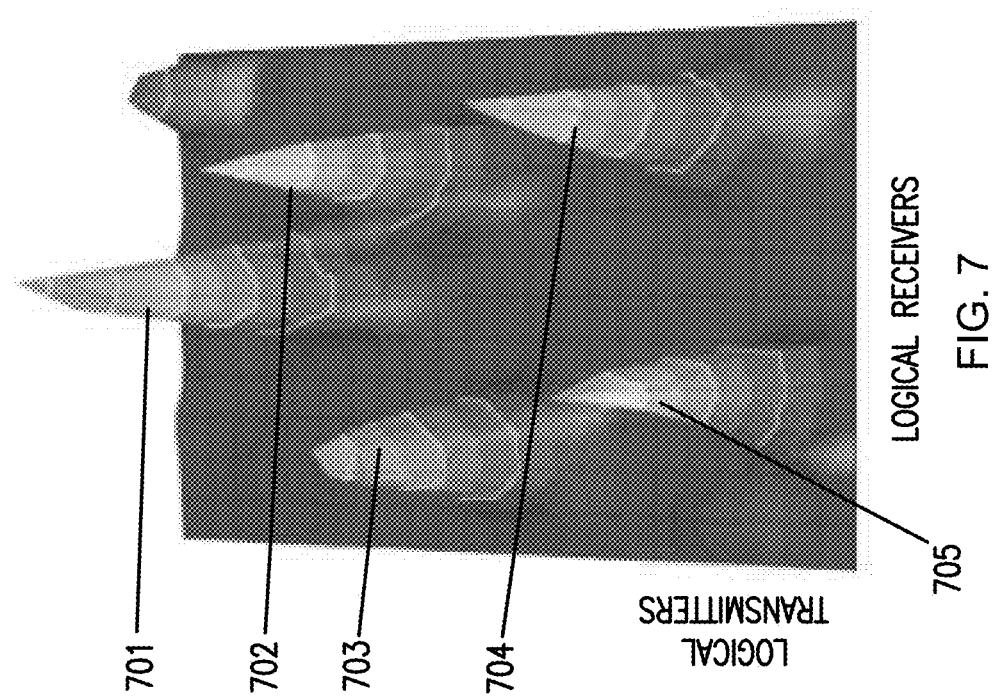
FIG. 6 is a three-dimensional plot of an example raw sensor image.
FIG. 7 is three-dimensional plot of a transformed sensor image corresponding to the sensor image of FIG. 6 after application of a spatial filter in accordance with one embodiment.

As mentioned previously, some sensor devices are referred to as "image" sensors in that they produce a two-dimensional array or matrix of values (associated with the resulting signals) in response to the presence of an input object in the sensing region. In such arrays, one axis (e.g., the rows) of the array corresponds to a series of "logical" transmitters (e.g., not necessarily the location of a physical transmitter), while the other axis (e.g., the columns) of the array corresponds to a series of "logical" receivers. The values themselves might include real numbers or integer values, and may be normalized (e.g., with respect to a maximum value in the matrix). Furthermore, such images may be visualized as three-dimensional "surface" plots, two-dimensional contour plots, intensity plots, or any other suitable visual representation. For example, as described in further detail below, FIGS. 4 and 5 depict contour plots, while FIGS. 6 and 7 depict surface plots.

The term "baseline" as used herein refers, in general, to the image (or set of baseline values) that is produced when no input object is present in the sensing region. As is known in the art, such baselines are often characterized by relatively complex contours, and depend to a large extent on the geometry of the individual sensor electrodes, background capacitance, interference, and other factors. Baseline values (or "baseline images") serve as the basis for determining the measured values and the location of input objects in the sensing region. For this reason, it is generally desirable to determine the baseline values from resulting signals taken during times when no objects are in the sensing region. Thus, in a typical input device resulting signals (and preliminary values) are being continuously generated by the input device. Some of these resulting signals will be generated when no objects are believed to be within the sensing region. In most systems it is those resulting signals that are commonly used to generate the baseline values. When valid, the baseline values provide an effective basis determining changes in capacitance that occur in response to the presence of objects. However, when invalid, such baseline value can often produce unsatisfactory position information.

Furthermore, once a miscalculation of the baseline values occurs, there is a significant probability of errors persisting. For example, in some cases the miscalculation of the baseline values will result in the input device erroneously determining that an input object is in the sensing region and/or the positional information for an input object in the sensing region. In one embodiment, once such a determination is made it may persist until new baseline values may be determined. In this application, the term "hallucinated object" refers to an incorrect determination of an input object being in the sensing region. As described above, a hallucinated object may result from miscalculated baseline values, but may also arise from other circumstances.

As mentioned above, filter module 206 is configured to produce a transformed sensor image by applying a spatial filter to the first sensor image—i.e. a filter that takes as its input a number of values distributed along both axes. As used herein, for example, the spatial filter operates on a two-dimensional sensor image whose axes, as described above, correspond to logical transmitter electrodes and receiver electrodes.

Figure 3A:
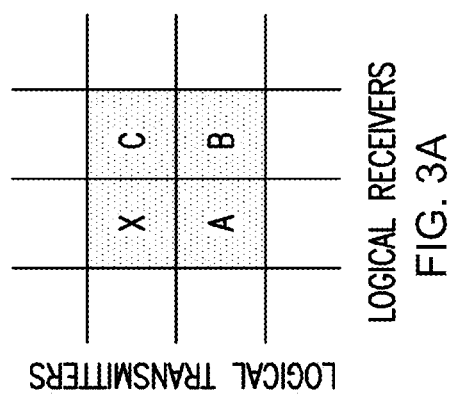
FIG. 3A depicts a matrix useful in describing various embodiments.

FIG. 3A depicts a portion of an example sensor image highlighting four squares (or "cells") whose values are labeled (clockwise from upper left) X, C, B, and A. In general, then, a 2×2 spatial filter might take as its input any one or a combination of X, C, B, and A, and output a value that is then used as the new value of X (i.e., in the transformed image). While FIG. 3 depicts a 2×2 filter, the invention is not so limited: any suitable filter dimensions (3×3, 3×2, etc.), including various square or rectangular filters, may be employed.

Figure 3B:
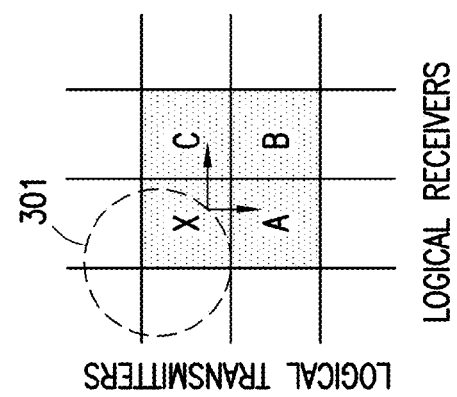
FIG. 3B depicts the matrix of FIG. 3A in the presence of an input object.

In accordance with one embodiment, a high-pass spatial filter is used—e.g., a filter that is on the order of about 3×3 to 2×2 in size. Such a filter responds to spatial derivatives; thus, for a flat surface or a surface with constant slope, the filter will be "unresponsive" (i.e., substantially flat). It is desirable that the filter respond to the presence of an input object while being unresponsive to other topological features of the raw image. In some embodiments, a 2×2 filter achieves this result by rejecting any constant slope at any angle (that is, any constant slope along the x axis, any constant slope along the y axis, or any combined constant slope at some diagonal of x and y.) In contrast, an input object will generally be round and, relative to any reference pixel, will have non-zero slopes in different directions when compared to the reference pixel. This is depicted in FIG. 3B, which illustrates the case where an input object (designated by the dashed circle 301) is placed such that an edge of the input object is placed over a particular pixel X. As can be seen, the slopes (i.e., delta in image values) along both the x and y axes would be non-zero (i.e., X−C and X−A).

In one embodiment, the spatial filter is a two-axis gradient sweep (TAGS) filter. That is, the spatial filter is one that, in general, operates on differences between adjacent (or diagonal) cell values along both axes (i.e., logical transmitters electrodes and logical receiver electrodes). Such filters provide improved performance over standard matrix convolution filters and 2D filter kernels. In one embodiment, the filter is characterized by the function:

$$X=abs(abs(A-C)-abs(X-B)) \qquad \text{(eq. 1)}$$

That is, the transformed value of X is set equal to the absolute value of the difference between two diagonal deltas: the absolute value of A−C and the absolute value of X−B.

In another embodiment, the filter is characterized by the function:

$$X=abs((B-C)-(A-X)) \qquad \text{(eq. 2)}$$

In another embodiment, the filter is characterized by the function:

$$X=abs((A-C)-(B-X)) \qquad \text{(eq. 3)}$$

In yet another embodiment, the filter is characterized by the function:

$$X=abs((A-C)-(X-B)) \qquad \text{(eq. 4)}$$

In other embodiments, a combination of the above functions may be used. For example, the filter may be characterized by the maximum of one or more of the above equations—e.g., equation 1 and equation 2.

To further illustrate the operation of such filters, FIG. 4 depicts a "delta" sensor image depicted as a two-dimensional contour plot (i.e., contours correspond to the borders of adjacent grayscale regions). This delta image corresponds to the difference between a raw image and a baseline. In this example, two fingers are stationary within the sensing region, resulting in two corresponding peak regions 401 and 402. The x-axis corresponds to logical receiver electrodes, and the y-axis corresponds to logical transmitter electrodes.

FIG. 5 depicts a transformed sensor image after application of a TAGS filter to a raw image corresponding to the delta image shown in FIG. 4. Specifically, FIG. 5 depicts the application of the filter characterized by equation 1 above. As can be seen, regions 501 and 502 show reasonable correlation (spatially) with regions 401 and 402 shown in FIG. 4. It has been found that this embodiment produces a relatively high signal-to-noise ratio, and edge electrodes can be discarded without substantial loss of input object detection.

As mentioned briefly above, in accordance with one embodiment the spatial filter is applied in a reduced accuracy mode—i.e., a mode wherein the absolute accuracy of the detected input objects is reduced by some degree in favor of validating the baseline values. This reduction in accuracy may result from the particular spatial filter being used. In equation 1 (and FIG. 3), for example, it can be seen that the function is asymmetrical with respect to X. That is, the X cell is in the upper left corner of the cells that are used as arguments of the function (rather than in the center of, for example, a 3×3 region). As a result, the transformed sensor image is slightly skewed or distorted diagonally from the upper left to the lower right. This can be seen in FIG. 5, where the centers (or centroids) of regions 501 and 502 are offset diagonally from the centroids of regions 401 and 402 of FIG. 4. While such filters generally cause a reduction in accuracy, the distortion and offsets are deterministic and easy to characterize, and thus corrections can be applied to the transformed sensor image to determine the true location of input objects, with very little reduction in accuracy.

FIGS. 6 and 7 show similar images in the form of three-dimensional surface plots. That is, FIG. 6 depicts a raw sensor image in which five fingers are present within the sensing region (corresponding to regions 601-605). The effects of the fingers can be seen embedded within the irregular surface of the image. FIG. 7 then shows a transformed sensor image after application of a TAGS filter (specifically, equation 1 above). Regions 701-705 respectively correspond (with some reduction in accuracy) to regions 601-605 in FIG. 6. As can be seen, the base region between regions 701-705 have been substantially flattened with respect to FIG. 6.

As mentioned previously, the systems and methods provided herein may be used to validate the baseline values or, alternatively, to determine position information without using baseline values. In one embodiment, for example, determination module 208 determines that the baseline is invalid (and measures a new one) if an input object is detected in the transformed sensor image. In another embodiment, processing system 110 (FIG. 1) is configured to perform aggressive relaxation when an input object is detected in the transformed sensor image. That is, baseline values that are different from or greater than a set of corresponding preliminary values (i.e., a previously measured baseline), are correspondingly changed or decreased over time, realigning the baseline values with the preliminary values.

In some embodiments, the baseline is determined upon power-up. As a result, if one or more input objects are present within the sensing region during power-up, the delta image (i.e., the difference between the raw image and the baseline image) will be substantially flat since the fingers are effectively "stuck" in the baseline. In accordance with the present invention, however, the use of filters as described above would produce a transformed image upon power-up similar to that shown in FIG. 7 (assuming five input objects in the sensing region).

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for an input device, the processing system comprising:
   a sensor module comprising sensor circuitry, the sensor module configured to drive a plurality of transmitter electrodes with transmitter signals; receive, with a plurality of receiver electrodes, resulting signals comprising effects corresponding to the transmitter signals; and produce, based on the resulting signals, a first sensor image comprising raw data; and
   a filter module, wherein the filter module is configured to produce a transformed sensor image by applying a spatial filter to the raw data in the first sensor image, wherein the spatial filter is a two-axis gradient sweep filter;
   a determination module configured to determine at least one of positional information and a validity of a baseline for the input device based on the transformed sensor image.

2. The processing system of claim 1, wherein the determination module determines that the baseline is invalid if an input object is detected in the transformed sensor image.

3. The processing system of claim 1, wherein the processing system is configured to perform relaxation when an input object is detected in the transformed sensor image.

4. The processing system of claim 1, wherein the filter module is configured to apply the spatial filter substantially simultaneously with the determination module determining the validity or the baseline.

5. A method for an input device, comprising:
    driving a plurality of transmitter electrodes with transmitter signals;
    receiving, with a plurality of receiver electrodes, resulting signals comprising effects corresponding to the transmitter signals;
    producing, based on the resulting signals, a first sensor image comprising raw data;
    producing a transformed sensor image by applying a spatial filter to the raw data in the first sensor image, wherein the spatial filter is a two-axis gradient sweep filter; and
    determining at least one of positional information and a validity of a baseline for the input device based on the transformed sensor image.

6. The method of claim 5, further including determining that the baseline is invalid if an input object is detected in the transformed sensor image.

7. The method of claim 5, further including performing relaxation when an input object is detected in the transformed sensor image.

8. The method of claim 5, further including applying the spatial filter substantially simultaneously with determining the validity of the baseline.

9. A sensor device comprising:
    a plurality of transmitter electrodes;
    a plurality of receiver electrodes;
    a processing system communicatively coupled to the plurality of transmitter electrodes and the plurality of receiver electrodes, the processing system configured to:
        drive a plurality of transmitter electrodes with transmitter signals;
        receive, with a plurality of receiver electrodes, resulting signals comprising effects corresponding to the transmitter signals;
        produce, based on the resulting signals, a first sensor image comprising raw data; and
        produce a transformed sensor image by applying a spatial filter to the raw data in the first sensor image, wherein the spatial filter is a two-axis gradient sweep filter; and
        determine at least one of positional information and a validity of a baseline for the input device based on the transformed sensor image.

10. The sensor device of claim 9, wherein the determination module determines that the baseline is invalid if an input object is detected in the transformed sensor image.

11. The sensor device of claim 9, wherein the processing system is configured to perform relaxation when an input object is detected in the transformed sensor image.

12. The sensor device of claim 9, wherein the filter module is configured to apply the spatial filter substantially simultaneously with the determination module determining the validity of the baseline.

* * * * *